May 29, 1951     W. BACKMAN     2,554,692

COLOR-REFLECTING PLASTIC BUTTON WITH CENTRAL PLUG

Filed March 14, 1947     2 Sheets-Sheet 1

INVENTOR.
WILLIAM BACKMAN
BY
    Munn, Liddy & Glaumm
ATTORNEYS.

May 29, 1951 W. BACKMAN 2,554,692
COLOR-REFLECTING PLASTIC BUTTON WITH CENTRAL PLUG
Filed March 14, 1947 2 Sheets-Sheet 2

INVENTOR.
WILLIAM BACKMAN
BY
Mason, Liddy & Glaceum
ATTORNEYS.

Patented May 29, 1951

2,554,692

UNITED STATES PATENT OFFICE 2,554,692

COLOR-REFLECTING PLASTIC BUTTON WITH CENTRAL PLUG

William Backman, Sacramento, Calif.

Application March 14, 1947, Serial No. 734,618

5 Claims. (Cl. 41—20)

The present invention relates to improvements in color-reflecting plastic buttons and it consists of the combinations, constructions, and arrangement of parts, hereinafter described and claimed.

An object of my invention is to provide buttons that are particularly attractive in appearance, the body of each button being transparent and having a colored plug inserted thereinto. Each button body is fashioned with a reflecting surface encircling the plug and arranged to give colored images of the plug when the button is viewed from various positions. As the button is moved about relative to an observer, the color image will shift, thus adding to the general aesthetic appeal.

A still further object is to make the body of the button from suitable plastic material, such as plastic made from acrylic acid. Likewise, the plug is formed from similar material. In one form of the invention, I bond a transparent plug to the button body by a solvent containing a dyestuff, and the latter produces the desired color which is to be reflected to an observer. A modified form embodies a plug made from a colored plastic rod, and this type of plug is bonded to the button body by a clear solvent. In either case, the coloring employed is protected by the button body against wear.

Another object of my invention is to provide a series of steps for making color-reflecting buttons from sheet plastic. I am aware of the fact that these buttons may be made with an injection molding machine so as to materially reduce the cost of manufacture, and I shall disclose one form of button made by such a machine.

Other objects and advantages will appear as the specification continues, and the novel features will be set forth in the claims hereunto appended.

For a better understanding of the invention, reference should be had to the accompanying drawings, forming part of this application, in which.

Figure 4:
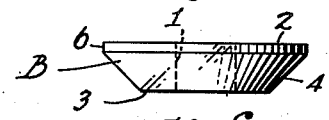
Figure 5:
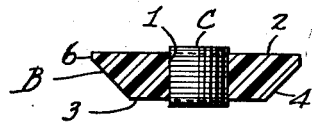
Figure 6:
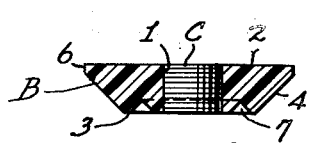
Figure 7:
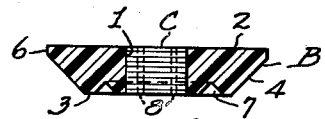
Figure 8:
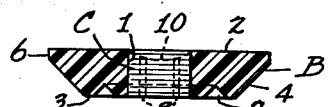
Figure 9:
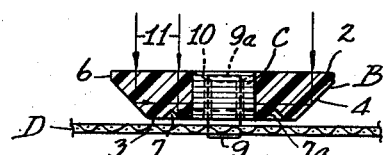
Figure 10:
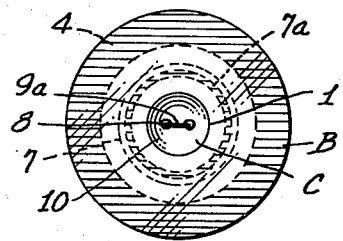
Figure 11:
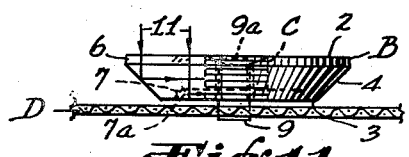
Figure 12:
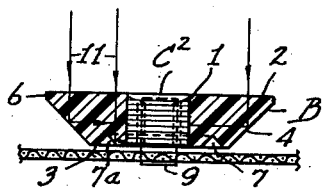
Figure 16:
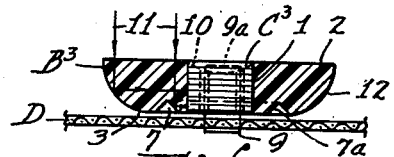
Figure 13:
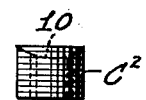
Figure 17:
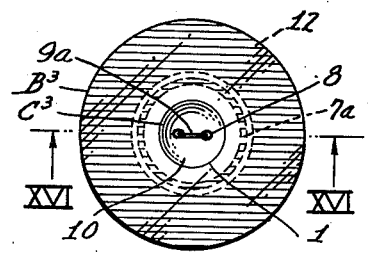
Figure 14:
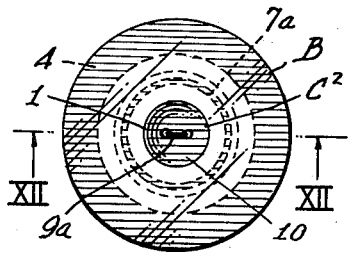
Figure 18:
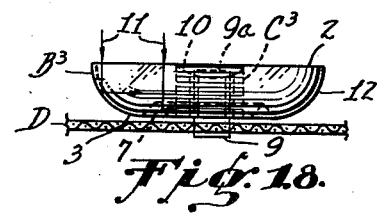
Figure 15:
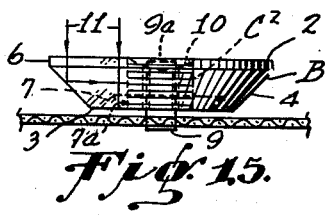
Figure 19:
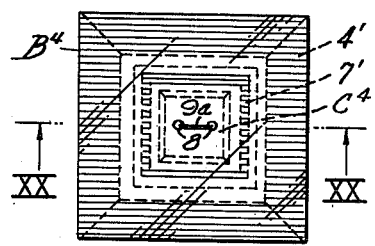
Figure 20:
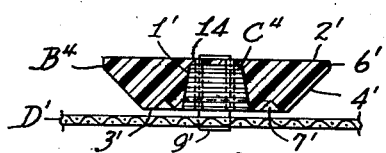
Figure 21:
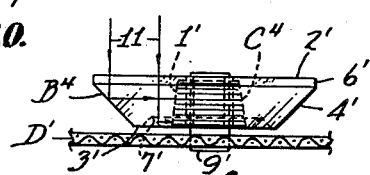

Figure 4 discloses the tapered disc with its sharp rim removed;

Figure 5 is a vertical sectional view that illustrates the disc with a transparent plastic plug bonded in the opening of the disc or body of the button, the plug being shown in elevation and its ends projecting beyond the front and back faces of the body;

Figure 6 is another vertical section that carries out the steps of lapping each face of the button to remove residual dye and also the protruding ends of the plug, and further showing a groove fashioned in the back of the button body;

Figure 7 is a view similar to Figure 6, but showing thread-receiving openings drilled in the plug;

Figure 8 illustrates the next step of drilling or grinding a recess in the top of the plug to receive loops of threads;

Figure 9 is a vertical sectional view through the button, the plug being shown in elevation, and illustrating the completed button as being stitched to a section of cloth;

Figure 10 is a top plan view of the completed button;

Figure 11 is an elevational view of the button with the latter stitched to the cloth;

Figure 12 is a vertical sectional view through a second form of a completed button, the plug being shown in elevation, formed from colored plastic rod, and bonded to the button body by clear solvent; it being noted that this view is taken along the line XII—XII of Figure 14;

Figure 13 is an elevational view of the colored plug used in Figure 12;

Figure 14 is a top plan view of modification shown in Figure 12;

Figure 15 is an elevation of the button shown in Figure 14;

Figure 16 is a vertical section taken along the line XVI—XVI of Figure 17 and showing a third modification of my color-reflecting button;

Figure 17 is a top plan view of this third modification;

Figure 18 is an elevation of the button shown in Figure 17;

Figure 19 is a top plan view of a fourth form of button, which may be made with an injection molding machine;

Figure 20 is a vertical sectional view taken along the line XX—XX of Figure 19; and Figure 21 is an elevational view of this fourth modification.

While I have shown only the preferred forms of my invention, it should be understood that various changes, or modifications, may be made within the scope of the appended claims without departing from the spirit of the invention.

Referring to the drawings in detail, first I shall describe the consecutive steps of my method, as shown in Figures 1 to 8, inclusive, which result in producing the button illustrated in Figures 9 to 11, inclusive.

Figure 1:
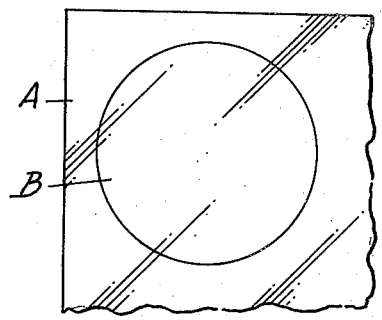
Figure 1 is a plan view of a piece of sheet plastic illustrating a disc or blank being cut therefrom.
Figure 2:
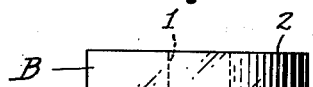
Figure 2 is a side elevation of the disc disclosing it formed with a cavity or opening extending therethrough.
Figure 3:
Figure 3 shows the same disc after its marginal rim has been tapered toward the underside of the disc.

In Figure 1, I disclose a piece of sheet plastic A from which a disc or blank B is cut. This sheet may be Lucite, Plexiglas, or other suitable transparent material. The disc thus provided is fashioned with a cavity or opening 1, which is shown as extending from the front 2 to the back 3 of the disc. A bevelled surface 4 is formed around the disc, as disclosed in Figure 3, the bevel tapering toward the back of the disc. It will be understood that the tapered disc, as shown in Figure 3, may be cut directly from the sheet A by using a radius cutter, the opening 1 being formed at the same time by the drill advancing ahead of the cutter.

As the next step, an arbitrary number of these discs are placed on a mandrel; and using the lathe, the sharp circumference 5 is cut off to the desired diameter. This results in a narrow rim 6 surrounding the disc, and the disc at this stage of the method is shown in Figure 4.

Now the discs or blanks are mounted individually on a tapered lathe arbor and held in place by friction. They are lapped or sanded to remove tool marks and sharp corners. Next, the discs or blanks B are buffed and polished individually in such a manner as to bluff the entire circumference of the bevel 4 and narrow rim 6.

Plug C, which is made from clear plastic material and dimensioned to fill the cavity or opening 1, is dipped in plastic solvent containing dye stuff. In actual practice, I use ethylene di-chloride as a solvent, although others may be employed. A solvent-dipped plug is inserted into the opening 1 so as to protrude a slight distance beyond the front and back 2 and 3, respectively, of the disc B (see Figure 5). The disc will constitute the body of the button to be formed. The solvent will bond the plug to the disc.

The front 2 and back 3, as well as the protruding plug ends are lapped flat to clean off residual dye and remove the protruding ends of the plug. Then, the front and back faces are buffed. The product at this time is shown in Figure 6.

A concentric groove 7 may be fashioned around the plug C in the back 3 or underside of the button body B. More than one concentric groove may be formed, if desired, and the groove or grooves could be formed later as the making of the button proceeds. The use of a groove or grooves is optional. The groove has been illustrated as being V-shaped in cross section with an included angle of 90°, although I do not desire to be limited in this respect.

Thread-receiving openings 8 are drilled lengthwise through the plug, as shown in Figure 7. These openings are adapted to have threads 9 passed therethrough for stitching the button to a garment D, or the like. As an optional step, the top of the plug may be drilled or ground to provide a recess 10. The latter will accommodate loops 9a of the threads in order that the loops will be positioned below the front face 2 of the button body.

When viewing the button from the front thereof, as suggested by the lines of sight 11 in Figures 9 and 11, images of the color contained in the dye stuff will appear on the tapered reflecting surface 4 and also on the innermost sloping surface $7a$ of the groove 7. Of course, as the attitude of presentation of the button relative to an observer is changed, the colored images in the surfaces 4 and $7a$ will change, in accordance with well-known principles of reflection of light. Upon viewing the button from a lateral position, as in Figure 11, the color around the plug will be visible.

The second form of my button, as covered in Figures 12 to 15, inclusive, is the same as the first form, excepting for the fact that the plug $C^2$ is made from colored plastic rod, and clear solvent is used for bonding the plug to the body B of the button. This eliminates the clean up operation of removing residual dye. Like reference numerals have been applied to corresponding parts.

The third form of my button is shown in Figures 16 to 18, inclusive. The button body $B^3$ is fashioned in the same manner as in the previously-described forms, excepting the marginal rim is rounded, or convexed, at 12 so as to taper toward the back 3. The plug $C^3$ may be made from clear plastic and bonded to the body $B^3$ by colored solvent, as in the first form of the invention; or the plug may be fashioned from colored plastic rod and bonded to the body $B^3$ by clear solvent, as in the second form. Otherwise, the three forms are identical. Accordingly, like reference numerals have been applied to designate corresponding parts.

An injection molding machine may be used for making the button body $B^4$ and plug $C^4$ shown in Figures 19, 20 and 21. The body illustrated in these views has sloping surfaces 4', which taper toward the back 3' thereof, and a narrow rim 6' is arranged adjacent to the front 2' of the body. The latter has a truncated pyramid shape. A groove 7' surrounds the plug $C^4$. Threads 9' are used for stitching the button to a garment D', or other cloth.

The body $B^4$ is molded from transparent plastic and has a recess 1' formed in the underside or back 3' thereof. The recess and the mating plug $C^4$ are made with just enough taper to insure a snug fit with the ends of the plug disposed flush with the top and bottom of the recess. This eliminates the possibility of the plug being inserted too far. The recess 1' does not completely penetrate the button body, as shown in Figure 20, which leaves a thin web 14 overlying the plug.

The thickness of this web may approach so nearly zero as to give effect of the plug being inserted all the way through the button body. This web completely obviates the necessity of clean up operation on the front 2' of the button body, or on the back 3' in event that the recess is fashioned in the opposite face of the body.

When the plug $C^4$ is made from clear plastic, a colored solvent is used for bonding it to the button body. In case this plug is fashioned from colored plastic, a clear solvent would be used for the bondage.

Although I have shown only round and square buttons in the drawings, it is obvious that oval, triangular, pentagonal, hexagonal, and other shapes could be used. Also, correspondingly-shaped plugs, as well as round, may be employed. The angle of taper of the reflecting surfaces surrounding the button bodies has been disclosed as 45°. However, this angle may be increased, or decreased, within limits and still reflect images of the color to an observer.

The term "cavity" as employed in the claims is sufficiently broad to include an opening extending entirely through the button body, or a recess extending only part way therethrough. The expression "colored plug," as used in certain claims, covers a clear plug with colored solvent applied thereto, or a plug of colored plastic, such as used when clear solvent is employed.

I claim:

1. In a color-reflecting button; a transparent button body having a colored plug therein; the body having a front surface and being provided with a reflecting surface encircling the plug and disposed substantially at a 45° angle to the front surface to give a colored image of the plug when the body is viewed from the front thereof.

2. In a color-reflecting button; a transparent button body having a front and a back; a colored plug disposed in the body; the body being provided with a reflecting surface encircling the plug and disposed substantially at a 45° angle to the front to give a colored image of the plug when the body is viewed from the front thereof; the back of the body having a groove formed therein to encircle the plug; the groove also having a reflecting surface to give a colored image of the plug when the body is viewed from its front.

3. In a color-reflecting button; a transparent button body having a front and a side; a colored plug disposed in the body; the body being provided with a reflecting surface encircling the plug and disposed substantially at a 45° angle to the front to give a colored image of the plug when the body is viewed from the front thereof; the coloring also being visible through the sides of the button body.

4. In a color-reflecting button; a transparent body having a front and a back; a centrally-disposed colored plug mounted therein; the body having a reflecting surface extending entirely therearound; the reflecting surface tapering to the back of the button at a substantially 45° angle.

5. In a color-reflecting button; a transparent button body having a front face; a colored transparent plug disposed in the body; the body being provided with a rim constituting a reflecting surface encircling the plug and disposed at an angle of about 45° to the front face to give a colored image of the plug when the body is viewed from the front face thereof.

WILLIAM BACKMAN.

REFERENCES CITED

The following references are of record in the file of this patent:

UNITED STATES PATENTS

| Number | Name | Date |
| --- | --- | --- |
| D. 149,314 | Shapiro | Apr. 13, 1948 |
| 235,799 | Naylor | Dec. 21, 1880 |
| 2,122,246 | Clewell | June 28, 1938 |
| 2,128,095 | Levy | Aug. 23, 1938 |
| 2,240,900 | Bauer | May 6, 1941 |
| 2,298,365 | Gits | Oct. 13, 1942 |
| 2,354,857 | Gits et al. | Aug. 1, 1944 |
| 2,385,467 | Purington | Sept. 25, 1945 |
| 2,423,640 | Dally | July 8, 1947 |
| 2,428,977 | Mares | Oct. 14, 1947 |

OTHER REFERENCES

Article in the Popular Mechanics, February 1946, page 97, on "Striped Heart is Built of Laminated Plastic Sheets," by Lophoff.